Sept. 10, 1963 L. H. EWALD 3,103,572
STRIPPING MACHINES
Filed May 31, 1962 3 Sheets-Sheet 1

INVENTOR.
Lux H. Ewald
BY
Attorney

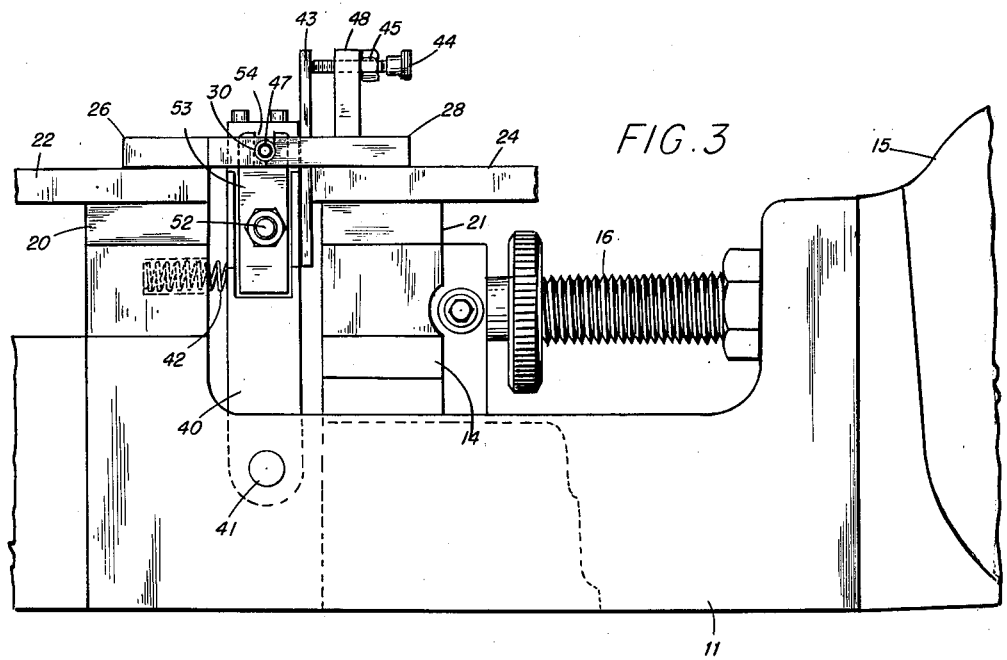
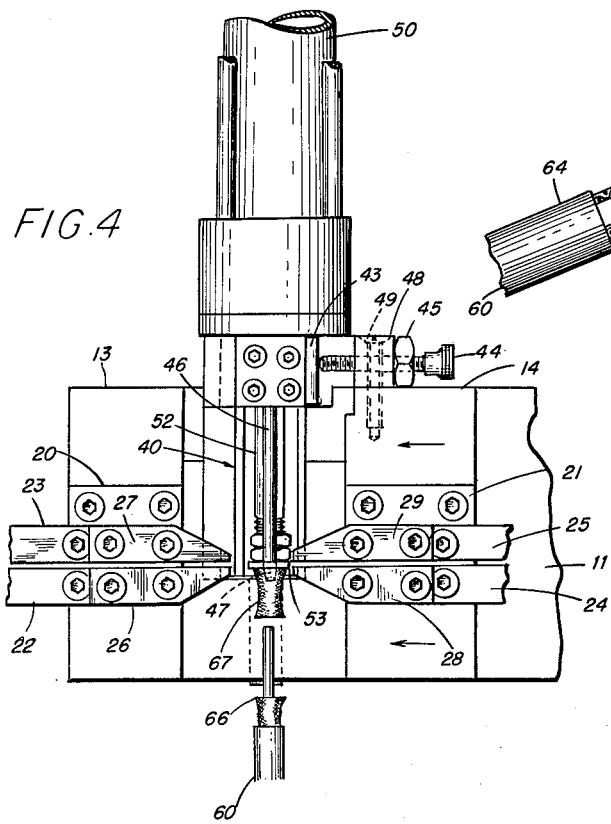
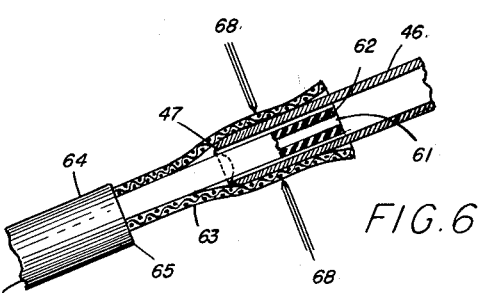
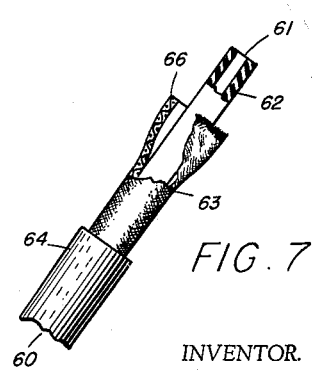

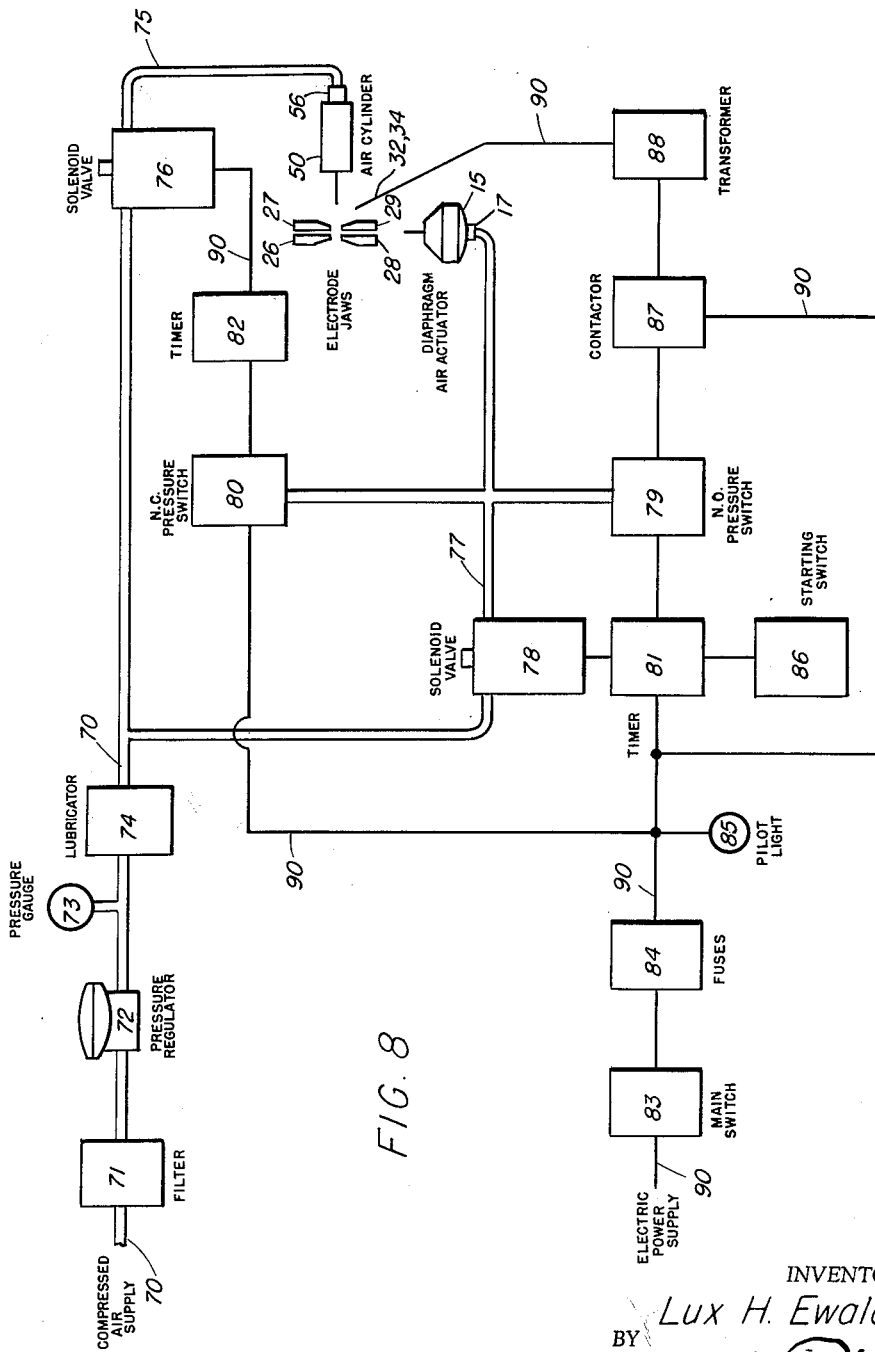

United States Patent Office 3,103,572
Patented Sept. 10, 1963

3,103,572
STRIPPING MACHINES
Lux H. Ewald, Rte. 7, Kent, Conn.
Filed May 31, 1962, Ser. No. 199,093
8 Claims. (Cl. 219—19)

This invention relates to machines for stripping shielding wires from elongated objects such as electric conductors, armored hoses, flexible shafts and the like.

The shielding armor on such objects is usually in the form of a braid made of many fine wires. In using these elongated objects it is generally necessary to remove a portion of the shielding armor for attaching connectors to their ends.

Mechanical devices for cutting the shielding have been proposed. However, such cutting devices not only are apt to injure the rubber or plastic material usually present inside the shielding, but the ends of the cut wires have a tendency to unravel which is not only unsightly but also makes it difficult to fit connectors. In order to prevent such unravelling the shielding has sometimes been tinned prior to cutting, but this adds another separate operation and increases the cost.

It has also been proposed to remove the shielding by placing two closely adjacent electrodes on the shielding and passing an electric current through them to sever the shielding by fusing it. Such devices likewise have not proven satisfactory in the past because the heat released in the fusion damages the rubber or plastic material underneath the shielding, and they do not permit the rapid stripping operation desirable in the interest of economy.

It is an object of this invention to provide a stripping machine which severs the shielding cleanly and rapidly without injury to the rubber or plastic material inside the shielding, and which leaves the shielding wires ravel-proof.

Another object is to provide a stripping machine which automatically ejects the stripped off piece of shielding.

Still another object of this invention is to provide a stripping machine in which the successive steps of the stripping process are performed automatically in their correct sequence and at high speed.

The manner in which the foregoing objects are achieved is shown in the appended drawings in which:

FIG. 3 is a view similar to that of FIG. 2 with the electrode jaws in closed position;

FIG. 4 is a fragmentary plan view similar to FIG. 1 with the ejector in the extended position, ejecting a stripped off piece of shielding;

FIG. 6 is a view, partly in cross-section, of a shielded electric conductor pushed on the arbor preparatory to the stripping operation;

FIG. 7 is a view of the stripped conductor shown in FIG. 6; and

FIG. 8 is a schematic diagram of the power supply and the devices providing automatic operation of my machine.

Figures 1, 2, 5:
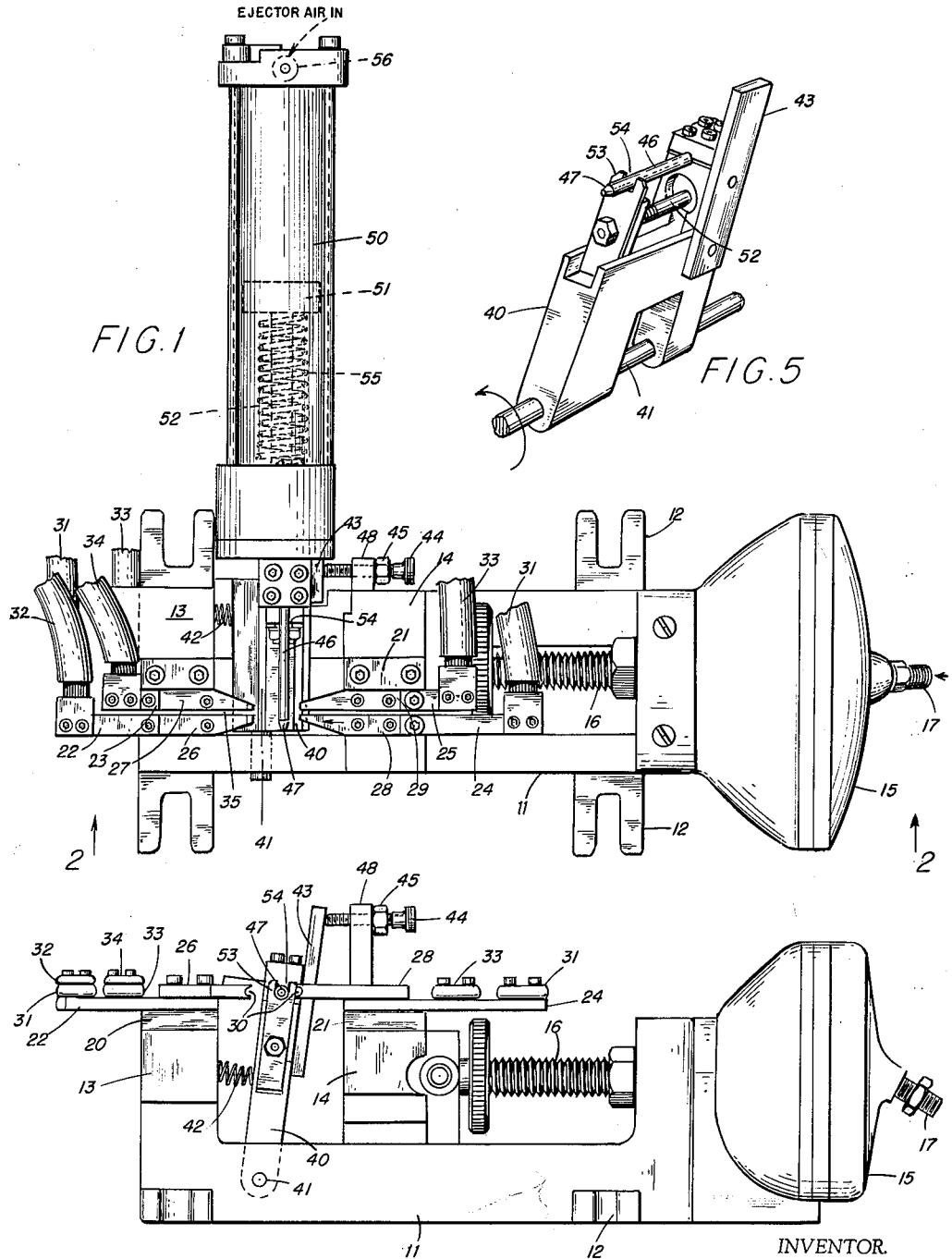
FIG. 1 is a plan view of a stripping head in accordance with my invention, with the electrode jaws in open position.
FIG. 2 is an elevational view of the head shown in FIG. 1 taken in the direction of the arrows 2 of FIG. 1.
FIG. 5 is a perspective view of a portion of my machine shown in FIG. 1.

Referring now to FIGS. 1 to 5, a stripping head according to my invention comprises a base 11 provided with lugs 12 for attachment to a work bench. The base 11 has an integral post 13 and a slide 14 which is movable by a connecting rod 16 connected with a diaphragm air actuator 15 mounted on the base 11 and provided with an air connection 17.

On post 13 and slide 14 are mounted insulators 20 and 21, respectively. Electrode carriers 22 and 23 are attached to the insulator 20, and electrode carriers 24 and 25 are attached to the insulator 21. Electrode jaws 26, 27, 28 and 29, each provided with a groove 30 in its working face, are fastened to the electrode carriers 22, 23, 24 and 25, respectively. The grooves 30 are preferably of semi-circular configuration conforming to the outside diameter of the shielding armor to be stripped.

Cable 31 interconnects electrode carriers 22 and 24 and a supply cable 32, and cable 33 similarly interconnects electrode carriers 23 and 25 and a supply cable 34. (Portions of cables 31 and 33 have been broken away in FIG. 1 for clarity of presentation.) Thus, the electrode jaws 26 and 28 form one set, and the electrodes jaws 27 and 29 form another set, the two sets being insulated from each other and separated by a narrow gap 35.

On the base 11 a bracket 40 is pivotally mounted by a pin 41. A spring 42 urges the bracket 40 towards the slide 14 and presses a plate 43 fastened to the bracket 40 against an adjustable stop screw 44 secured in position by a lock nut 45 on a bracket 48 fastened to the slide 14 by a screw 49. On the bracket 40 is mounted a tubular arbor 46 in such position that a portion of it is located adjacent to and faces the grooves 30.

The material used for the arbor 46 must be electrically insulating and temperature resistant in order to be able to withstand the heat released in fusing the shielding. The end of the arbor 46 is bevelled, as indicated at 47. The bracket 40 also carries an air cylinder 50 with a piston 51 having a piston rod 52 on the outward end of which is mounted an ejector head 53 with a cut-out portion 54 hugging the arbor 46. A spring 55 urges the piston 51 back against the pressure of air supplied through a connection 56.

Before the machine is placed in operation the position of the bracket 40 with the electrode jaws 26 to 29 in closed position (FIG. 3) is adjusted by means of stop screw 44 so that the arbor 46 is located equidistantly from all the grooves 30, this distance being such as to accommodate the shielding to be stripped between the outer surface of the arbor 46 and the surfaces of the grooves 30, with the electrode jaws in firm contact with the shielding.

FIG. 6 shows by way of example an electric conductor 60 placed on the arbor 46, ready to be stripped. The conductor 60 has a core 61 covered by insulation 62, a shielding made of wire braid 63 and an outer jacket 64 made of soft plastic which must be cut back, as indicated at 65, preparatory to stripping the shielding. The conductor 60 is pushed onto the arbor 46 which slides between the insulation 62 and the shielding 63, slightly flaring and expanding the latter, as shown. The bevelling 47 facilitates the entry of the arbor 46. The arbor 46 extends a short distance beyond the lines 68—68 on which the gap 35 between the electrode jaws 26 to 29 is located during the fusion, thus protecting the insulation 62 against injury by the heat released during the fusion. FIG. 7 shows the conductor 60 after stripping, with the ends of the remaining wire braid 63 neatly fused together, as indicated at 66. FIG. 4 shows the stripped off piece 67 of the shielding being ejected.

FIG. 8 is a schematic diagram of the power supply and the control and ancillary devices providing automatic operation. Compressed air is supplied to a pipe 70 provided with a filter 71, a pressure regulator 72, a pressure gauge 73 and a lubricator 74 which adds a small quantity of oil to the air passing through it. The pipe 70 is divided into two branches, branch 75 leading to the connection 56 on the air cylinder 50 and controlled by a solenoid valve 76, and branch 77 leading to the connection 17 on the diaphragm air actuator 15 and controlled by a solenoid valve 78. The valves 76 and 78 are of the 3-way type. When energized they admit to the branches 75 and 77 compressed air from pipe 70; when de-energized they vent the branches 75 and 77 to the atmosphere. To the branch 77 are connected two pressure switches 79 and 80, the former normally open and adapted to be closed on application of pressure, the latter normally closed and adapted to be opened on application of pressure. Two electric timers 81 and 82 are provided. They are of the automatically re-setting type, have an adjustable time cycle of up to two seconds and a normally open switch which is closed upon energization of the timer and opened again at the end of the time cycle. I have obtained satisfactory performance with both timers 81 and 82 adjusted so that their switches remain closed for about one-half second. Other electrical devices included in this arrangement are a main switch 83, fuses 84, a pilot light 85 (to show when the main switch 83 is closed that electric current is being supplied and the machine is ready to operate), a starting switch 86, a contactor (solenoid switch) 87, and a transformer 88 to transform the supplied line current to the low voltage, high amperage current required by the electrodes. The starting switch 86 is advantageously of the foot pedal type so as to leave both hands of the operator free to feed and remove the work. The line 90 with its various branches indicates functional electric connections, not wires. The actual wiring is somewhat involved, and since all the electrical devices are of standard commercial construction and well understood, this method of presentation has been chosen in the interest of a simple and easily understood diagram.

The stripping head of FIGS. 1 to 5 is advantageously placed in a housing or casing (not shown) which has an opening large enough and so located as to permit axial access to the arbor 46 in both its positions. This casing may be made large enough to also accommodate the various devices shown in FIG. 8. However, in order to conserve bench space I prefer to make the housing of the machine small and compact by mounting most of the control and ancillary devices in a separate casing placed nearby, as underneath a work bench, and connected to the stripping head by the necessary wires and air hoses.

In operating the stripping machine, initially the solenoid valves 76 and 78 are de-energized so that branches 75 and 77 are vented. The electrode jaws 26 to 29 are in their open position, the bracket 40 is tilted and the ejector head 53 is retracted, all as shown in FIGS. 1 and 2. The pressure switches 79 and 80 are in their normal position, the contactor 87 is open, and the timers 81 and 82 are in zero position with their switches open.

The operator pushes a work piece, such as the electrical conductor 60 shown in FIG. 6, onto the arbor and closes the starting switch 86. This energizes timer 81 which closes its switch, admitting electric current to the pressure switch 79 and the solenoid valve 78 which now admits compressed air to branch 77. Within a small fraction of a second the raised pressure in branch 77 does the following: (a) through the air actuator 15 moves the electrode jaws 28 and 29 to their closed position and centers the arbor 46 within the grooves 30, the electrode jaws 26 to 29 firmly contacting the wire braid 63; (b) closes the pressure switch 79 which then energizes the solenoid of contactor 87 which in turn now supplies current through transformer 88 to the electrode jaws; this current flows from the one set of electrode jaws 26, 28 through the wire braid 63 to the other set 27, 29, melting the shielding between the two sets of jaws; this takes place very rapidly and therefore without much release of heat, and the melting of the wire braid 63 stops the flow of current; (c) opens pressure switch 80, resetting the timer 82 to zero position. The pressure switch 79 closes at a somewhat higher pressure than that required by the diaphragm air actuator 15 to move. This arrangement ensures that the electrode jaws 26 to 29 are in their closed position before they are supplied with electric current through the closing of pressure switch 79. Within one-half second from the start the switch of timer 81 opens again de-energizing solenoid valve 78 and cutting off the supply of electricity to pressure switch 79, opening contactor 87. Valve 78 vents branch 77 to the atmosphere, and as soon as the pressure in branch 77 has dropped off the following takes place: (a) the air actuator 15 moves the electrode jaws 28 and 29 to the open position and causes the bracket 40 to tilt due to the pressure of spring 42 so that the distances between the arbor 46 and the grooves 30 are increased and none of the electrode jaws 26 to 29 are in contact with the wire braid 63; (b) the pressure switch 79 opens; (c) the pressure switch 80 closes, energizing the timer 82 which closes its switch and energizes solenoid valve 76 so as to admit compressed air to branch 75; piston 51 moves forward and the ejector head 53 pushes the stripped off piece 67 of shielding from the arbor 46, as shown in FIG. 4. If the operator has not already withdrawn the stripped work piece at this time it will be pushed out by the piece 67. Within one-half second after timer 82 has been energized its switch opens, deenergizing solenoid valve 76 which vents branch 75. The spring 55 pushes the piston 51 back, retracting the ejector head 53. Timer 81 is re-set to zero position upon completion of its time cycle or the opening of switch 86 by the operator, whichever occurs later. This leaves all parts in their initial position, ready to repeat the cycle of steps.

While the switches of the timers 81 and 82 are closed successively for one-half second, some additional time is consumed for the pressure in branches 75 and 77 to build up and drop off. Thus the machine requires approximately one and one-half seconds to complete its cycle. The interval between successive cycles depends, of course, on the operator. In actual use, production rates in excess of 1000 pieces per hour have been achieved.

In order to provide the required two relative positions of the electrodes and the arbor it is necessary to move relative to the third item any two items of the group of elements consisting of the arbor, one electrode jaw of each set, and the other electrode jaw of each set. The third item is advantageously fixed to the base and held stationary. Thus, my machine may be modified by mounting the arbor on the base in a fixed position and by supporting the electrode jaws 26 and 27 on another slide which is moved in the opposite direction to slide 14 by a second air actuator connected to branch 77 so as to operate in unison with air actuator 15.

The starting switch 86 may also be modified. In lieu of a foot pedal switch a manual push-button can be used, or the initiation of the machine cycle may be made automatic in response to insertion of the work piece to be stripped by providing a limit switch which is closed by the inserted work piece, as for instance by means of a pin placed inside the tubular arbor which is pushed back by the core of the work piece and thereby actuates the limit switch.

Ejection of the stripped off piece 67 from the arbor 46 involves relative movement between the ejector head 53 and the arbor 46 in the direction of the axis of the arbor. While I prefer to move the ejector head and hold the arbor stationary, the reverse is quite feasible. Thus, the arbor may be axially shiftable in its bracket or mounting with the spring loaded piston arranged to retract it on application of pressure. In such modification the ejector head may disappear as a separate part, but its function will, of course, be performed by a portion of the bracket or mounting adjacent to the arbor.

I prefer to use pneumatic power means to shift the various movable parts on the stripping head, but other means employing, for instance, hydraulic or electric power may, of course, be substituted if desired.

While I have shown and described what I consider the best form of my invention, modifications such as those referred to herein and others may be made without departing from its spirit, and reference is, therefore, made to the following claims for a definition of the scope of my invention.

What I claim is:

1. A stripping machine comprising a base, a tubular arbor made of temperature resistant insulating material and adapted to fit inside the shielding of an object to be stripped, two sets of electrode jaws, grooves in said electrode jaws facing said arbor, said two sets of electrode jaws being spaced apart a short distance in the direction of the axis of said arbor, said arbor and said electrode jaws of each set being movable relative to each other in a direction at right angles to the axis of said arbor, one electrode jaw of each set being shiftably supported by said base, another electrode jaw of each set and said arbor being movable relative to each other, one of said two last named means being movably supported by said base and the other of said means being rigidly mounted on said base, and means mounted on said base for shifting said shiftably supported electrode jaws and said movably supported means in unison to two alternative positions in one of which said electrode jaws of both sets are closed and said arbor is located at small and equal distances from all said grooves, and in the other of which positions said electrode jaws of both sets are open and said distances between said arbor and said grooves are increased.

2. In the combination of claim 1, a mechanism for ejecting stripped off shielding from said arbor which mechanism comprises an ejector head adjacent to said arbor and means for changing the relative positions of said arbor and said ejector head by moving one of said last named two elements relative to the other.

3. A stripping machine comprising a tubular arbor made of temperature resistant insulating material and adapted to fit inside the shielding of an object to be stripped, two sets of electrode jaws, grooves in said electrode jaws facing said arbor, said two sets of electrode jaws being spaced apart a short distance in the direction of the axis of said arbor, at least one electrode jaw of each set being movable toward and away from the other electrode jaw at right angles to the axis of said arbor, means for moving said movable electrode jaws of both sets in unison to two alternative positions in one of which the electrode jaws of both sets are closed and in the other of which the electrode jaws of both sets are open, and a mechanism for ejecting stripped off shielding from said arbor which mechanism comprises an ejector head adjacent to said arbor and means for changing the relative positions of said arbor and said ejector head by moving one of said last named two elements relative to the other.

4. In the combination of claim 3, power means for operating said position changing means, electric wires for connecting said sets of electrode jaws with a supply of electric energy, a switch in said wiring, means for closing and opening said switch, and means operatively connected with said switch closing and opening means for actuating said power means.

5. A stripping machine comprising a tubular arbor made of temperature resistant insulating material and adapted to fit inside the shielding of an object to be stripped, two sets of electrode jaws, grooves in said electrode jaws facing said arbor, said two sets of electrode jaws being spaced apart a short distance in the direction of the axis of said arbor, at least one electrode jaw of each set being movable toward and away from the other electrode jaw at right angles to the axis of said arbor, power means for moving said movable electrode jaws of both sets in unison to two alternative positions in one of which the electrode jaws of both sets are closed and in the other of which the electrode jaws of both sets are open, a mechanism for ejecting stripped off shielding comprising an ejector head adjacent to said arbor, power means for changing the relative location of said arbor and said head by moving one of said last named two elements relative to the other alternatively to ejecting and non-ejecting positions, electric wiring for connecting said sets of electrode jaws with a supply of electric energy, a switch in said wiring, power means for alternatively closing and opening said switch, and timing means controlling said power means.

6. A stripping machine comprising a tubular arbor made of temperature resistant insulating material and adapted to fit inside the shielding of an object to be stripped, two sets of electrode jaws, grooves in said electrode jaws facing said arbor, said two sets of electrode jaws being spaced apart a short distance in the direction of the axis of said arbor, at least one electrode jaw of each set being movable toward and away from the other electrode jaw at right angles to the axis of said arbor, pneumatic power means for moving said movable electrode jaws of both sets in unison to two alternative positions in one of which the electrode jaws of both sets are closed and in the other of which the electrode jaws of both sets are open, a mechanism for ejecting stripped off shielding comprising an ejector head adjacent to said arbor, pneumatic power means for changing the relative location of said arbor and said head by moving one of said last named two elements relative to the other alternatively to ejecting and non-ejecting positions, electric wiring for connecting said sets of electrode jaws with a supply of electric energy, a switch in said wiring, pneumatic power means for alternatively closing and opening said switch, a supply pipe for compressed air having connections with said pneumatic power means, valve means controlling said connections, and timing means controlling said valve means.

7. A stripping machine comprising a tubular arbor made of temperature resistant insulating material and adapted to fit inside the shielding of an object to be stripped, two sets of electrode jaws, grooves in said electrode jaws facing said arbor, said two sets of electrode jaws being spaced apart a short distance in the direction of the axis of said arbor, at least one electrode jaw of each set being movable toward and away from the other electrode jaw at right angles to the axis of said arbor, pneumatic power means for moving said movable electrode jaws of both sets in unison to two alternative positions in one of which the electrode jaws of both sets are closed and in the other of which the electrode jaws of both sets are open, a mechanism for ejecting stripped off shielding comprising an ejector head adjacent to said arbor, pneumatic power means for changing the relative location of said arbor and said head by moving one of said last named two elements relative to the other alternatively to ejecting and non-ejecting positions, electric wiring for connecting said sets of electrode jaws with a supply of electric energy, a switch in said wiring, pneumatic power means for alternatively closing and opening said switch, a supply pipe for compressing air having two branches, a solenoid valve in each of said branches, two electric timers each controlling one of said solenoid valves, one of said branches being connected with said first and last named pneumatic power means, the other of said branches being connected with said second named power means, a starting switch for actuating the timer controlling the solenoid valve in said one branch, and a pneumatic switch connected with said one branch for actuating the timer controlling the solenoid valve in said other branch.

8. A stripping machine comprising a base, a tubular arbor made of temperature resistant insulating material and adapted to fit inside the shielding of an object to be stripped and thereby expand said shielding, two sets of electrode jaws spaced apart a short distance, grooves in each of said electrode jaws dimensioned to fit the outside of shielding expanded by said arbor, said two sets of electrode jaws being thereby adapted to grip shielding expanded by said arbor at two places a short distance apart, one electrode jaw of each set being rigidly mounted on said base, another electrode jaw of each set being movably supported by said base, and means mounted on said base for shifting said movably supported electrode jaws of both sets in unison to two alternative positions in one of which the electrode jaws of both sets are closed to grip shielding expanded by said arbor and in the other of which positions the electrode jaws of both sets are opened to release shielding expanded by said arbor.

References Cited in the file of this patent

UNITED STATES PATENTS

| | | |
|---|---|---|
| 2,768,276 | Arntzen | Oct. 23, 1956 |
| 2,978,565 | Sullivan et al. | Apr. 4, 1961 |

FOREIGN PATENTS

| | | |
|---|---|---|
| 91,959 | Norway | June 30, 1958 |